Oct. 5, 1965   G. CHIEGER   3,210,118
TRAILER DOOR CONSTRUCTION
Filed July 17, 1963

INVENTOR.
George Chieger.
BY
Harness, Dickey & Pierce
ATTORNEYS.

United States Patent Office 3,210,118
Patented Oct. 5, 1965

3,210,118
TRAILER DOOR CONSTRUCTION
George Chieger, Grosse Pointe Woods, Mich., assignor to Fruehauf Corporation, a corporation of Michigan
Filed July 17, 1963, Ser. No. 295,748
1 Claim. (Cl. 296—106)

This invention relates generally to an improved trailer door construction and more particularly to a door construction wherein outward forces on the door incident to shifting of a cargo are transmitted directly to the door frame as opposed to being transmitted thereto through the door hinges.

The rapid increase in the shipment of highway trailers on railway flat cars has created the need for an improved trailer door construction for such trailers that precludes damage of the trailer doors due to load shifting within the trailer incident to humping operations of the railway flat car. When shifting cargo within the trailer impinges against the inner surface of the door it tends to push the doors to the open condition as well as to excessively stress the door hinges. Such forces ultimately lead to failure of the door hinges as well as deterioration of the sealing means for the doors.

This problem is solved in accordance with the instant invention by a novel door construction wherein the outboard edge portions of the doors are engaged in a complementary recess in the door frame so that rearward forces acting upon the door are accepted directly by the door frame. The hinges for the door are thereby relieved of excessive stress. Further, the sealing means for the outboard edge of the door is contained within the complementary recess in the door frame in such a manner that it is not deleteriously affected by such rearward loads on the door. In addition, the door frame has a vertically extending channel for the acceptance of "bull boards" that transfer rearwardly directed loads on the door directly to the door frame.

Accordingly, one object of the instant invention is an improved trailer door construction.

Another object is a trailer door construction that provides for transfer of rearwardly directed forces on the door directly to the door frame.

Another object of the instant invention is a trailer door construction wherein the sealing means for the door is not deleteriously affected by relatively large rearwardly directed loads on the trailer door.

Other objects and advantages of the instant invention will be apparent in the following specification, claims and drawings, wherein:

Figure 1:
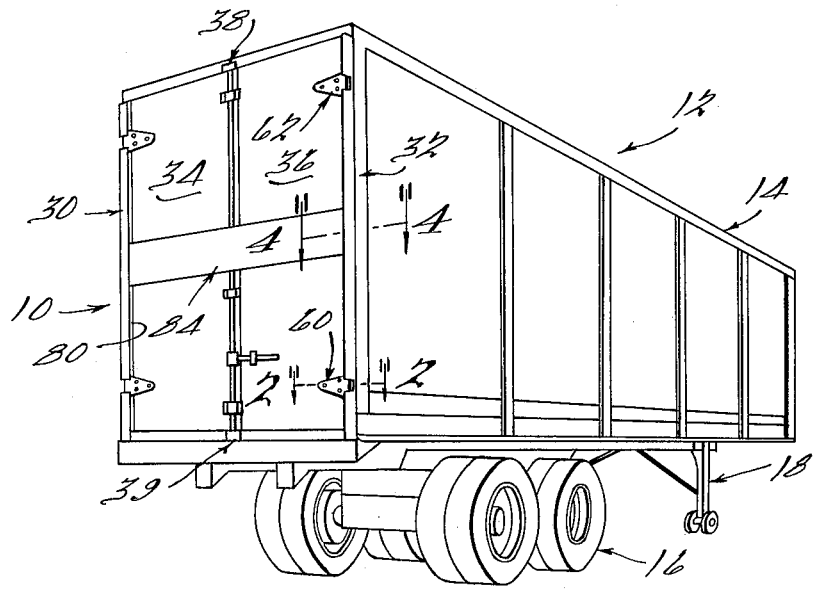
FIG. 1 is a perspective view of a heavy duty highway trailer having the improved door construction of the instant invention.

Referring to FIGURE 1 of the drawings, an improved trailer door construction 10 is shown in operative association with a semi-trailer 12. The trailer 12 is of conventional construction except for the construction 10 and comprises a van 14 having a wheel suspension 16 and landing gear 18.

The door construction 10 comprises a pair of vertically extending rear corner posts 30 and 32 upon which a pair of rear doors 34 and 36 are hinged. The doors 34 and 36 are provided with conventional locks 38 and 39.

Figures 2, 4:
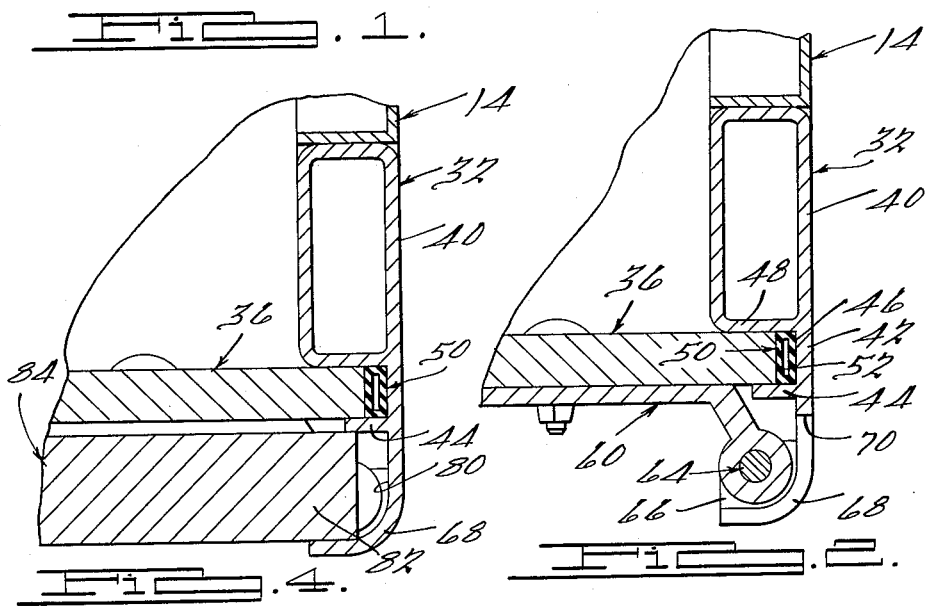
FIG. 2 is a cross sectional view taken substantially along the line 2—2 of FIG. 1.
FIG. 4 is a cross sectional view taken substantially along the line 4—4 of FIG. 1.
Figure 3:
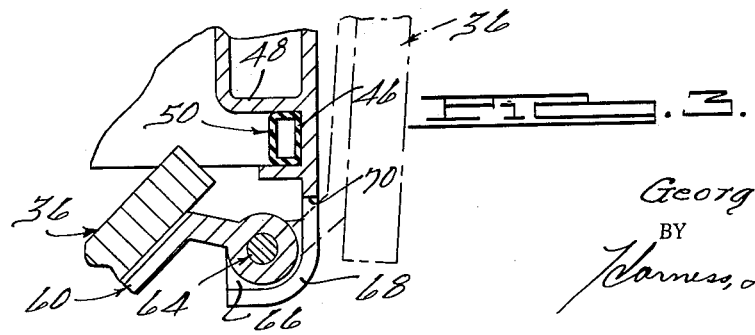
FIG. 3 is a cross sectional view similar to FIG. 2 with the door rotated to the open condition.

In accordance with the instant invention, and as best seen in FIGURES 2, 3 and 4 of the drawings, the vertical post 32, which is identical to the post 30 except for right and left hand orientation, is made from, for example, extruded steel or aluminum. The post 32 comprises a box section 40 having a rearwardly extending flange 42. A laterally extending flange 44 defines a recess 46 in conjunction with the flange 42 and a rear wall 48 of the box section 40.

In accordance with one feature of the instant invention, a compressable seal 50 is disposed in the recess 46 to preclude the infiltration of rain, dust, and other foreign materials between the door post 32 and door 36. It is to be noted that an outboard edge face 52 of the door 36 engages the seal 50 to compress it laterally against the flange portion 42 of the post 32 upon closing movement of the door 36.

The door 36 is supported for rotation relative to the post 32 by a pair of hinges 60 and 62 that are mounted on vertically extending pins 64 supported in vertically spaced pairs of horizontally extending hinge pin flanges, one of which is shown and designated by the numeral 66. The hinge pin flanges 66 are supported on a laterally inwardly folded rearward edge portion 68 of the post 32. It is to be noted that an aperture 70 is cut in the rearward edge portion 68 to provide for swinging movement of the hinge 60 to the dotted line position shown in FIGURE 3.

In accordance with another feature of the instant invention, when the door 36 is in the closed condition as shown in FIGURE 2, the outboard edge portion 52 thereof is engaged inwardly of the flange portion 44 of the post 32. Therefore, rearwardly directed loads on the door 36 are transferred directly to the flange 44 of the post 32 relieving the hinge 60 and hinge pin 64 of such loads.

In accordance with yet another feature of the instant invention, and as best seen in FIG. 4, the rear flange 68 of the post 32 defines a channel 80 for the acceptance of an edge portion 82 of a "bull-board" 84. The "bull-board" 84 extends across the doors 34 and 36 between the posts 30 and 32 to accept rearwardly directed loads on the door and transfer such loads directly to the posts 30 and 32.

From the foregoing description it should be apparent that the door construction of the instant invention minimizes loads on the hinges and hinge pins of the doors incident to rearward shifting of a load. Also, the door seals thereof are relieved of such rearwardly directed loads. In addition, the door construction is relatively inexpensive to fabricate and rugged in construction.

It is to be understood that the specific construction of the improved trailer door construction herein disclosed and described is presented for the purpose of explanation and illustration and is not intended to indicate limits of the invention, the scope of which is defined by the following claims.

What is claimed is:

A door construction for heavy duty trucks, trailers, shipping containers and the like comprising
    a generally rectangular door frame having a vertical door post, said door post having
    a hinge mounting flange extending outwardly generally normally to a plane defined by said door frame, said mounting flange having
    a load accepting flange thereon extending generally parallel to the plane defined by said door frame and defining a recess in conjunction with said post,
    a compressible seal in said recess,
    a pair of vertically spaced door hinges secured to said hinge mounting flange, and
    a door mounted for rotation relative to said door frame by said hinges, said door having
    a first edge portion adjacent said hinges extending parallel to the plane of said door frame when said door is in the closed condition and receivable in said recess inwardly of said load accepting flange upon movement of said door to the closed condition within said door frame whereby said first edge portion of said door transfers outwardly directed loads thereon directly to said door post and in a direction normal to the plane of said door frame, said door having a second edge portion extending at substantially a right angle to the plane of said door frame when said door is in the closed condition and receivable in said recess upon movement of said door to the closed condition to compress said seal in a direction generally parallel to the plane of said door frame.

References Cited by the Examiner
UNITED STATES PATENTS

| 327,238 | 9/85 | Cloud | 20—28 |
| 3,070,400 | 12/62 | Rivers | 296—28 |

MILTON BUCHLER, *Primary Examiner.*

A. HARRY LEVY, *Examiner.*